(12) United States Patent
Lee

(10) Patent No.: US 12,448,066 B2
(45) Date of Patent: Oct. 21, 2025

(54) RUBBER TRACK UNIT

(71) Applicant: LS MTRON LTD., Anyang-si (KR)

(72) Inventor: Sang Jae Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 575 days.

(21) Appl. No.: 17/876,257

(22) Filed: Jul. 28, 2022

(65) Prior Publication Data

US 2023/0031342 A1 Feb. 2, 2023

(30) Foreign Application Priority Data

Jul. 30, 2021 (KR) ................. 10-2021-0100344

(51) Int. Cl.
*B62D 55/21* (2006.01)
*B62D 55/20* (2006.01)
*B62D 55/28* (2006.01)
*B62D 55/32* (2006.01)

(52) U.S. Cl.
CPC .......... *B62D 55/211* (2013.01); *B62D 55/202* (2013.01); *B62D 55/28* (2013.01); *B62D 55/32* (2013.01)

(58) Field of Classification Search
CPC ...... B62D 55/20; B62D 55/28; B62D 55/211; B62D 55/202; B62D 55/275; B62D 55/32
See application file for complete search history.

(56) References Cited

U.S. PATENT DOCUMENTS

| | | | | |
|---|---|---|---|---|
| 2,332,976 A * | 10/1943 | Saurer | ................. | B62D 55/28 305/164 |
| 2,719,758 A * | 10/1955 | Proske | ................. | B62D 55/28 305/162 |
| 3,721,476 A * | 3/1973 | Andersson | ............. | B62D 55/27 305/162 |
| 7,703,863 B2 * | 4/2010 | Koolhiran | ............ | B62D 55/211 305/200 |
| 2011/0221266 A1 * | 9/2011 | Bonnetain | ............ | B62D 55/202 305/202 |

FOREIGN PATENT DOCUMENTS

| | | | | |
|---|---|---|---|---|
| GB | 579975 A | * | 8/1946 | |
| GB | 969732 A | * | 9/1964 | |
| GB | 2343426 A | * | 5/2000 | ........... B62D 55/275 |
| JP | 2001278138 A | | 10/2001 | |
| JP | 3154531 U | | 9/2009 | |
| JP | 2017193332 A | | 10/2017 | |

OTHER PUBLICATIONS

Office Action for related Korean Application No. 10-2021-0100344; action dated Sep. 8, 2025; (5 pages).

* cited by examiner

*Primary Examiner* — Kip T Kotter
(74) *Attorney, Agent, or Firm* — K&L Gates LLP

(57) ABSTRACT

The present disclosure relates to a rubber track unit including: a track main body configured to move by a drive transmitted from a sprocket installed in a vehicle; an elastic part configured to provide a surface pressurized by a road wheel; a support plate to which the elastic part is coupled; and a coupling part detachably coupling the support plate and the track main body so that the elastic part is detachably coupled to the track main body.

9 Claims, 8 Drawing Sheets

RUBBER TRACK UNIT

CROSS-REFERENCE TO RELATED APPLICATIONS

This application claims the benefit of the Korean Patent Applications No. 10-2021-0100344 filed on Jul. 30, 2021, which is hereby incorporated by reference as if fully set forth herein.

FIELD

The present disclosure relates to a rubber track unit used for traveling vehicles such as agricultural vehicles, military vehicles, and the like.

BACKGROUND

In general, a vehicle track, also called a caterpillar, is to travel a vehicle while moving by power transmitted from a sprocket installed in the vehicle.

The vehicle track is installed in various vehicles such as agricultural vehicles, military vehicles, and the like. The agricultural vehicles include tractors, combines, and the like, and the military vehicles include armored vehicles, tanks, and the like. As types of the vehicle track, there are largely metal tracks and rubber tracks.

FIG. 1 is a schematic block diagram of a rubber track device for a vehicle.

Referring to FIG. 1, a vehicle track device 1000 includes a plurality of rubber track units 110, and a plurality of connection parts 120.

The rubber track units 110 are connected to each other through the connection parts 120 to form a closed ring shape. A sprocket 200 is disposed inside the closed ring shape formed by the rubber track units 110. An idler, a road wheel, and the like may be disposed inside the closed ring shape formed by the rubber track units 110.

The connection parts 120 connect the rubber track units 110. When the sprocket 200 is rotated by a driving force generated by an engine installed in the vehicle, the rubber track units 110 circulate along the closed ring shape to travel the vehicle.

The rubber track unit 110 includes a track main body 111, and an elastic part 112. The track main body 111 is coupled to the connection parts 120. The track main body 111 may move a vehicle main body by being moved by a drive transmitted from the sprocket 200 to push the ground. The elastic part 112 is coupled to the track main body 111. The elastic part 112 functions to provide a surface that may alleviate the impact caused by the road wheel and may be elastically deformed so that the track main body 111 may provide a uniform surface to the road wheel.

Here, the rubber track unit 110 according to the related art is coupled in a manner in which the elastic part 112 is directly bonded to the track main body 111. Accordingly, in the rubber track unit 110 according the related art, it is difficult to remove the elastic part 112 bonded to the track main body 111 when the replacement of the elastic part 112 is required as the elastic part 112 is damaged by an external impact or the like. In addition, in order to couple a new elastic part to the track main body 111 after removing the elastic part 112 from the track main body 111, an operation of bonding the replaced elastic part to the track main body 111 is involved, so that there is a problem that the maintenance cost increases as the facility for bonding the elastic part to the track main body 111 is required.

SUMMARY

The present disclosure is directed to providing a rubber track unit in which an elastic part may be coupled to a track main body without being directly bonded, and the elastic part may be detached from or attached to the track main body.

The present disclosure may include the following configurations.

A rubber track unit according to the present disclosure includes: a track main body configured to move by a drive transmitted from a sprocket installed in a vehicle; an elastic part configured to provide a surface pressurized by a road wheel; a support plate to which the elastic part is coupled; and a coupling part configured to detachably couple the support plate and the track main body so that the elastic part is detached from or attached to the track main body.

According to the present disclosure, it is possible to achieve the following effects.

According to the present disclosure, an elastic part is implemented to be mounted on a track main body by coupling a support plate to which the elastic part is coupled and the track main body. Accordingly, according to the present disclosure, the elastic part can be coupled to the track main body even without being directly attached to the track main body, thereby improving convenience and efficiency of the operation that removes the elastic part from the track main body to reduce maintenance costs.

According to the present disclosure, an elastic part is implemented to be detached from or attached to a track main body by detachably coupling a support plate, to which the elastic part is coupled, to the track main body. Accordingly, according to the present disclosure, it is possible to improve convenience of the operation that replaces the elastic part which has a frequent replacement cycle, thereby increasing efficiency of a maintenance operation.

BRIEF DESCRIPTION OF THE DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DETAILED DESCRIPTION OF THE DISCLOSURE

Hereinafter, embodiments of a rubber track unit according to the present disclosure will be described in detail with reference to the accompanying drawings.

Figure 1:
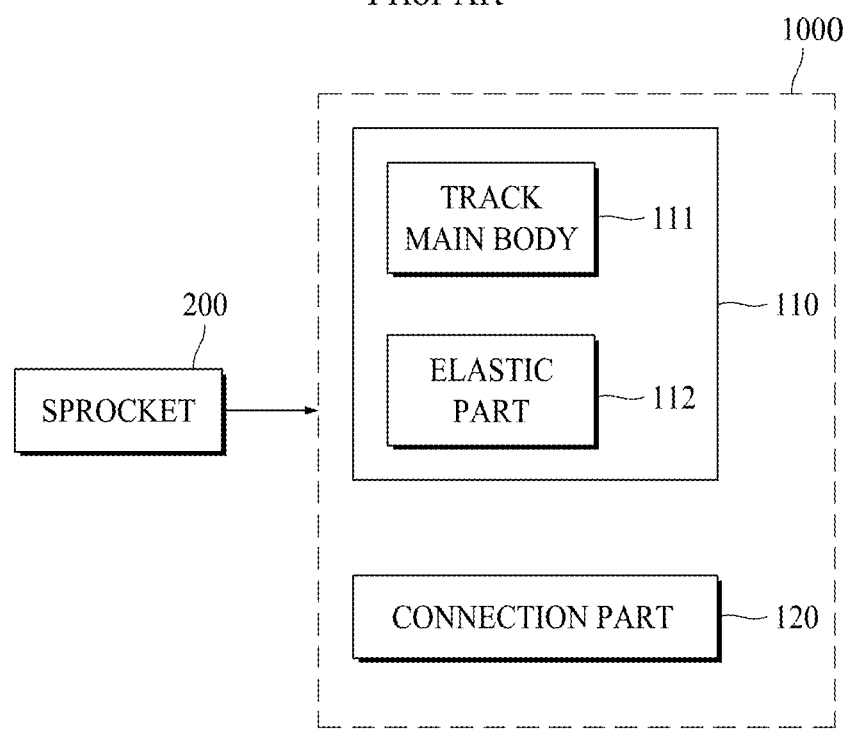
FIG. 1 is a schematic block diagram of a rubber track device for a vehicle including a rubber track unit according to the related art.
Figure 2:
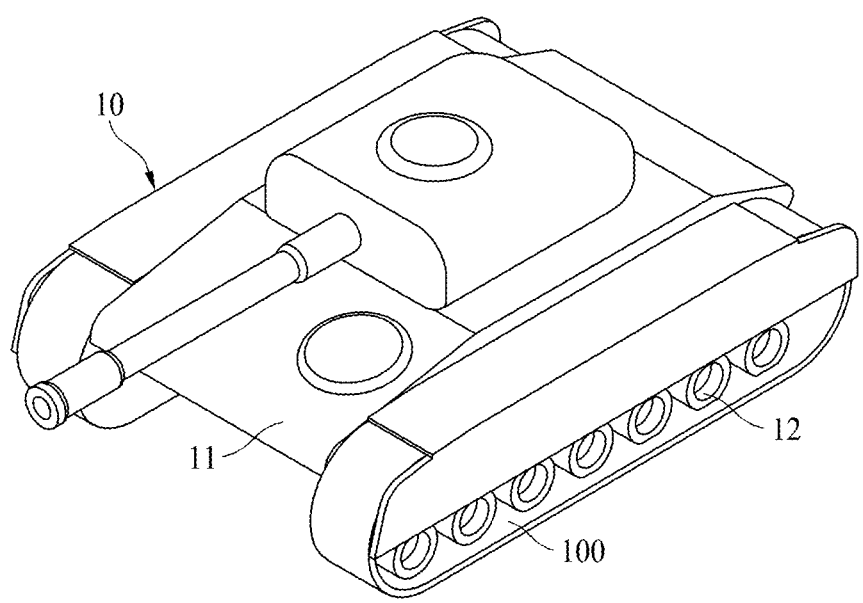
FIG. 2 is a schematic perspective view showing an example of a vehicle to which a rubber track unit according to the present disclosure is applied.
Figure 3:
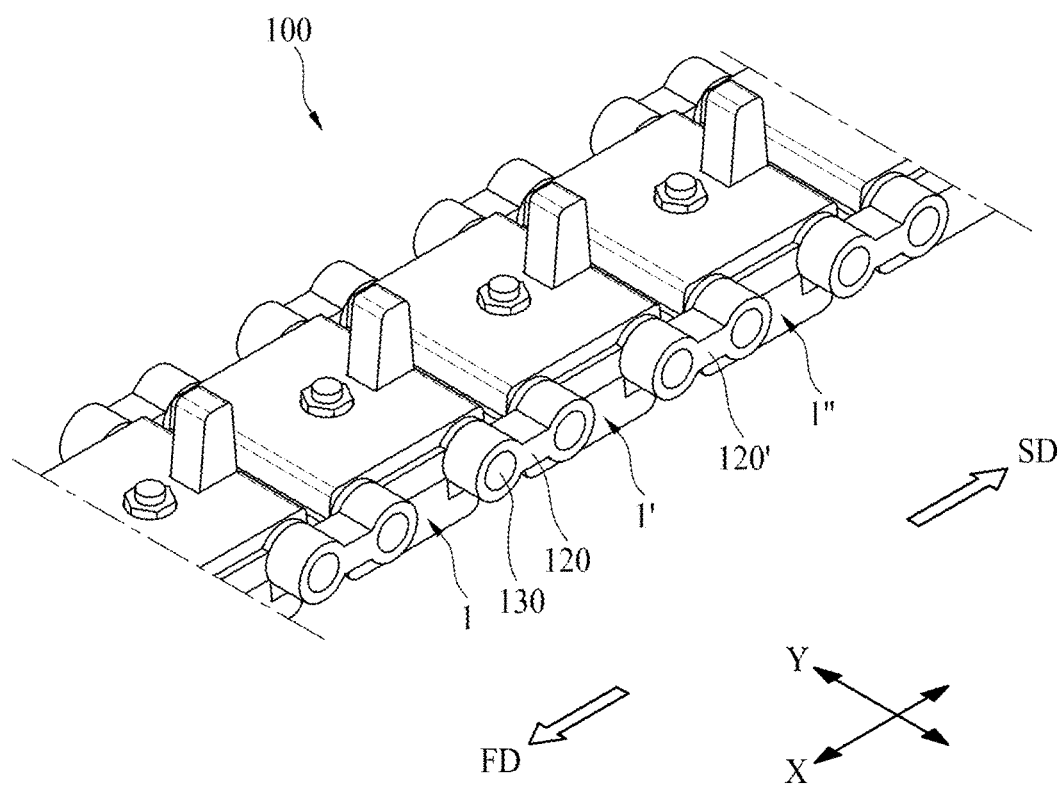
FIG. 3 is a partial schematic perspective view of a rubber track device for a vehicle to which the rubber track unit according to the present disclosure is applied.
Figure 4:
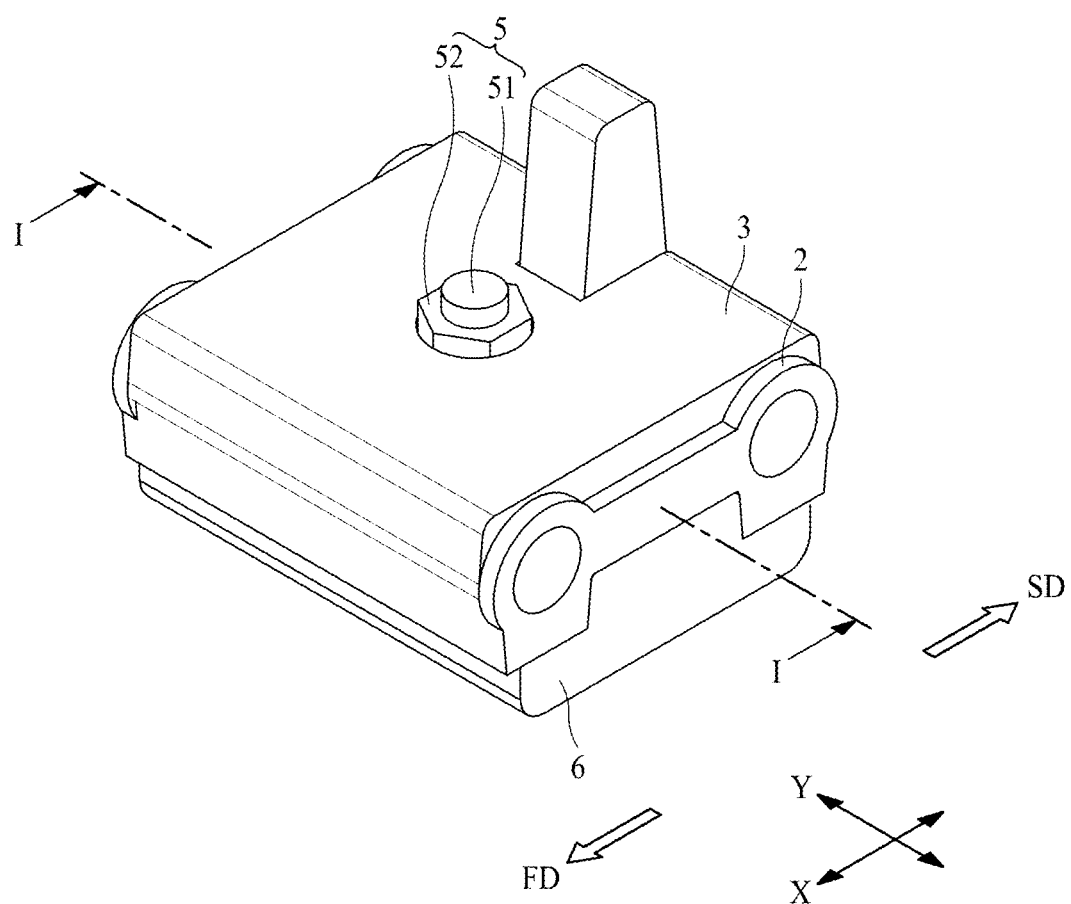
FIG. 4 is a schematic perspective view of the rubber track unit according to the present disclosure.
Figure 5:
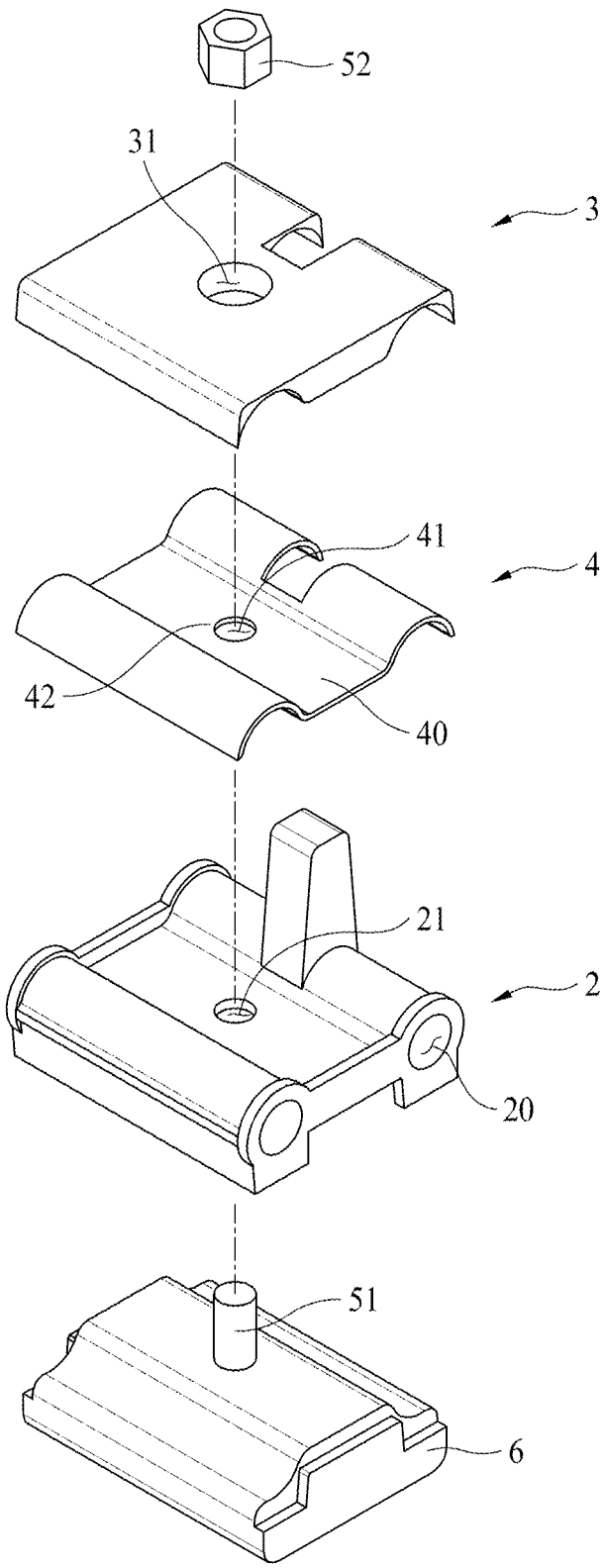
FIG. 5 is an exploded schematic perspective view of the rubber track unit according to the present disclosure.

Referring to FIGS. 2 and 3, a rubber track unit 1 according to the present disclosure is a configuration configuring a vehicle track device. The vehicle track device is installed in various vehicles such as agricultural vehicles and military vehicles, and is in charge of a traveling function for traveling the vehicle. The agricultural vehicles include tractors, combines, and the like, and the military vehicles include armored vehicles, tanks, and the like.

Before describing the rubber track unit 1 according to the present disclosure, a vehicle track device 100 (shown in FIG. 2) will be described as follows.

The vehicle track device 100 is installed in various vehicles such as agricultural vehicles and military vehicles, and is in charge of a traveling function for traveling the vehicle. For example, the vehicle track device 100 may be installed in agricultural vehicles such as tractors and combines. For example, the vehicle track device 100 may also be installed in military vehicles such as armored vehicles and tanks, construction vehicles, civil vehicles, and the like. As types of the vehicle track devices 100, there are largely metal tracks and rubber tracks. Hereinafter, the vehicle track device 100 will be defined and described as the rubber track, but it will be apparent to those skilled in the art to derive an embodiment in which the vehicle track device 100 is configured as the metal track.

The vehicle track device 100 may include a plurality of rubber track units 1 moved by a drive transmitted from a sprocket (not shown) installed in a vehicle 10 (shown in FIG. 2), and a plurality of connection parts 120 connecting the rubber track units 1 to each other.

The rubber track units 1, 1', and 1" are installed in a vehicle main body 11 of the vehicle 10 to form a closed ring shape. The sprocket for the rubber track, a plurality of road wheels 12 (shown in FIG. 2), an idler, and the like may be disposed inside the rubber track units 1, 1', and 1".

The connection parts 120 and 120' connect the rubber track units 1, 1', and 1" to each other. The connection parts 120 and 120' may connect the rubber track units 1, 1', and 1" so that the rubber track units 1, 1', and 1" form the closed ring shape. The rubber track units 1, 1', and 1" may maintain the closed ring shape as the rubber track units 1, 1', and 1" are connected by the connection parts 120 and 120'. The rubber track units 1, 1', and 1" may travel the vehicle main body 11 while circulating along the closed ring shape by the drive transmitted from the sprocket in a grounded state. The rubber track units 1, 1', and 1" may circulate along the closed ring shape by moving forward (FD arrow direction) or backward (SD arrow direction). The forward (FD arrow direction) and the backward (SD arrow direction) are directions parallel to a first axis direction (X-axis direction shown in FIG. 3). The first axis direction is a relative axis direction according to a movement direction of each of the rubber track units 1, 1', and 1", and may be changed depending on positions of the rubber track units 1, 1', and 1".

Hereinafter, the rubber track unit 1 according to the present disclosure configuring the vehicle track device 100 will be described in detail.

Referring to FIGS. 2 to 6, the rubber track unit 1 according to the present disclosure includes a track main body 2, an elastic part 3, a support plate 4, and a coupling part 5.

The track main body 2 is moved by the drive transmitted from the sprocket installed in the vehicle 10. The track main body 2 may be connected to the track main body 2 of an adjacent rubber track unit (not shown) by the connection part 120. Accordingly, the track main body 2 may form the closed ring shape together with track main bodies of other rubber track units. The elastic part 3 provides a surface to be pressurized by the road wheel 12. The elastic part 3 may provide a surface that may alleviate an impact caused by the road wheel 12 and may be elastically deformed so that the track main body 2 may provide a uniform surface to the road wheel 12.

The support plate 4 is coupled to the elastic part 3. The support plate 4 may be detachably coupled to the track main body 2 in a state in which the elastic part 3 is coupled. The coupling part 5 detachably couples the support plate 4 to the track main body 2. The support plate 4 may be detachably coupled to the track main body 2 by the coupling part 5 in a state of being coupled to the elastic part 3. Accordingly, the rubber track unit 1 according to the present disclosure may be implemented so that the elastic part 3 is detachably coupled to the track main body 2. Accordingly, the rubber track unit 1 according to the present disclosure can achieve the following operation effects.

First, in the rubber track unit 1 according to the present disclosure, since the elastic part 3 is indirectly coupled through the support plate 4 without being directly coupled to the track main body 2, the elastic part 3 is implemented so as not to be directly bonded to the track main body 2. Accordingly, the rubber track unit 1 according to the present disclosure can improve ease of an operation of removing the elastic part 3 from the track main body 2.

Second, in the rubber track unit 1 according to the present disclosure, the support plate 4 is detachably coupled to the track main body 2 using the coupling part 5, so that the elastic part 3 is implemented to be easily detached from or attached to the track main body 2. Accordingly, the rubber track unit 1 according to the present disclosure can improve ease of a maintenance operation by improving convenience and ease of an operation of replacing the elastic part 3 when the durability of the elastic part 3 has been degraded. In addition, the rubber track unit 1 according to the present disclosure can reduce maintenance costs by omitting a separate facility for bonding the elastic part 3 to the track main body 2, and replacing only the support plate 4 without replacing the track main body 2 together when the elastic part 3 is replaced.

Third, the rubber track unit 1 according to the present disclosure may be implemented so that the support plate 4 supports the elastic part 3, thereby improving ease of an operation of molding the elastic part 3 to reduce the manufacturing cost. For example, in a comparative example in which the elastic part 3 is directly coupled to the track main body 2, since the elastic part 3 should be molded so that the elastic part 3 corresponds to a surface of the track main body 2, there is a problem that the manufacturing cost of the elastic part 3 increases. In contrast, the rubber track unit 1 according to the present disclosure is implemented to omit the operation of molding the elastic part 3 to correspond to the surface of the track main body 2 as the elastic part 3 is coupled to the support plate 4. Accordingly, the rubber track unit 1 according to the present disclosure can reduce the manufacturing cost by improving ease of the operation of molding the elastic part 3.

Hereinafter, the track main body 2, the elastic part 3, and the support plate 4 will be described in detail with reference to the accompanying drawings.

Referring to FIGS. 2 to 6, the track main body 2 configures the overall external appearance of the rubber track unit 1 according to the present disclosure. The track main body 2 is moved by the drive transmitted from the sprocket installed in the vehicle 10, so that the vehicle main body 11 can be traveled. The track main body 2 may be connected to the track main body 2 of an adjacent rubber track unit (not shown) by the connection part 120. A connection fixing part 130 may be inserted into each of a connection insertion hole (not shown) formed in the connection part 120 and a main body insertion hole 20 formed in the track main body 2 to connect the connection part 120 and the track main body 2. The connecting part 120 is connected in the same structure as the track main body of the adjacent rubber track unit, so that the track main body 2 and the track main body of the adjacent rubber track unit may be connected. As this structure is repeatedly configured, the track main body 2 may form the closed ring shape together with track bodies of other rubber track units. An inner surface of the track main body 2 may be pressurized by the road wheel 12, and an outer surface of the track main body 2 may be pressurized by the ground. Here, the inner surface of the track main body 2 means a surface facing an inside of the closed ring shape, and the outer surface of the track main body 2 means a surface facing an outside of the closed ring shape.

The elastic part 3 provides a surface to be pressurized by the road wheel 12. The road wheel 12 may pressurize the track main body 2 by pressurizing the elastic part 3. The elastic part 3 may be disposed between the road wheel 12 and the track main body 2. The elastic part 3 may be disposed to cover the inner surface of the track main body 2. The elastic part 3 is elastically deformed when pressurized by the road wheel 12, so that it is possible to reduce a pressure applied to the track main body 2 by the road wheel 12, and a shape of the elastic part 3 is deformed to correspond to a surface that comes into contact with the road wheel 12, so that it is possible to provide a uniform contact area to the road wheel 12.

The support plate 4 supports the elastic part 3. The support plate 4 may be disposed between the elastic part 3 and the track main body 2 to support the elastic part 3. The support plate 4 may be detachably coupled to the track main body 2 through the coupling part 5 in a state of being coupled to the elastic part 3. A surface of the support plate 4 facing the track main body 2 may be formed in a shape corresponding to the surface of the track main body 2. The support plate 4 may be made of metal or plastic but is not necessarily limited thereto, and may be made of another material as long as it may support the elastic part 3.

The elastic part 3 may be bonded to the support plate 4 through a vulcanization operation. Accordingly, the elastic part 3 is bonded to the support plate 4 without being directly bonded to the track main body 2, and thus may be implemented to be fixed to the track main body 2 as the support plate 4 is coupled to the track main body 2. Accordingly, the rubber track unit 1 according to the present disclosure may implement the elastic part 3 to be detached from or attached to the track main body 2 using the support plate 4, and more firmly implement the structure in which the elastic part 3 is fixed to the track main body 2.

The coupling part 5 detachably couples the support plate 4 and the track main body 2. The coupling part 5 may include an insertion portion 51 and a fixing portion 52.

The insertion portion 51 assembles the support plate 4 and the track main body 2. The insertion portion 51 may be inserted into each of a support coupling hole 41 formed in the support plate 4 and a main body coupling hole 21 formed in the track main body 2 to assemble the support plate 4 and the track main body 2. The insertion portion 51 may be formed as a bolt. In this case, the support plate 4 may form a thread corresponding to a thread of the insertion portion 51 around the support coupling hole 41, and the track main body 2 may form a thread corresponding to the thread of the insertion portion 51 around the main body coupling hole 21. Accordingly, the insertion portion 51 may be inserted into each of the support coupling hole 41 and the main body coupling hole 21 to fasten the support plate 4 and the track main body 2.

The fixing portion 52 fixes the support plate 4 to the track main body 2. The fixing portion 52 may be coupled to the insertion portion 51. The fixing portion 52 may fix the support plate 4 to the track main body 2 by pressurizing the support plate 4 toward the track main body 2. Accordingly, the rubber track unit 1 according to the present disclosure can improve a fixing force in which the elastic part 3 coupled to the support plate 4 is fixed to the track main body 2. When the insertion portion 51 is implemented as a bolt, the fixing portion 52 may be implemented as a nut. The fixing portion 52 may be fastened to the insertion portion 51 to pressurize the support plate 4 toward the track main body 2.

The elastic part 3 may include a receiving hole 31 configured to receive the fixing portion 52. The receiving hole 31 may be formed to have a size larger than that of the support coupling hole 41. Accordingly, the fixing portion 52 may fix the support plate 4 to the track main body 2 by pressurizing the support plate 4 toward the track main body 2 in a state of being received in the receiving hole 31. A description thereof will be made in detail below.

Figure 6:
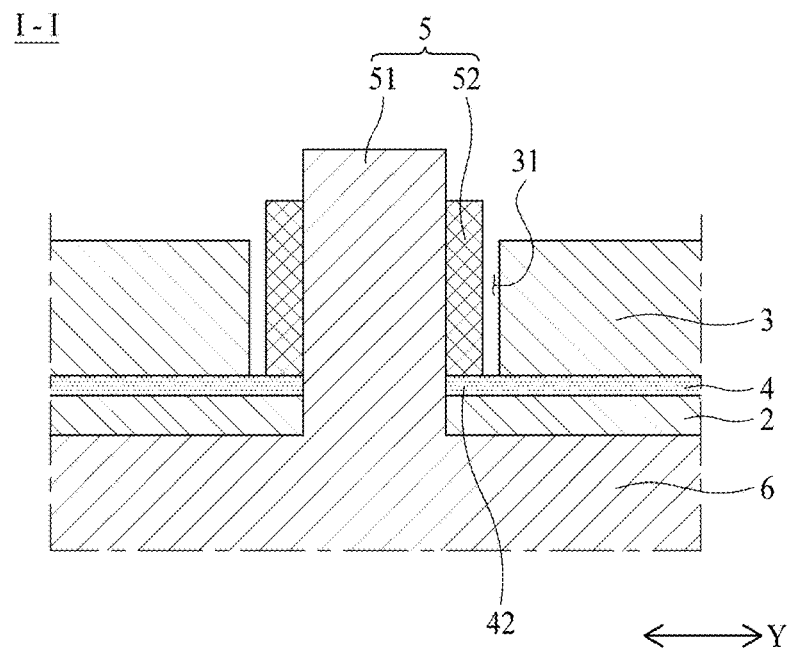
FIG. 6 is a partial schematic side cross-sectional view taken along line I-I in FIG. 4.

Referring to FIG. 6, the fixing portion 52 may pressurize a support fixing member 42 surrounding a periphery of the support coupling hole 41 in a state of being received in the receiving hole 31. As the receiving hole 31 is formed to have a size larger than that of the support coupling hole 41, the fixing portion 52 received in the receiving hole 31 may come into contact with the support fixing member 42. Accordingly, since the fixing portion 52 pressurizes the support fixing member 42 in a state of being received in the receiving hole 31, the elastic part 3 is implemented to pressurize only the support plate 4 without being pressurized. Accordingly, the rubber track unit 1 according to the present disclosure pressurizes the support plate 4 at a pressure stronger than a stiffness of the elastic part 3 even while the fixing portion 52 does not damage the elastic part 3, so that the support plate 4 may be implemented to further improve the fixing force applied to the track main body 2.

The rubber track unit 1 according to the present disclosure may include a pad part 6. The pad part 6 provides a surface to be pressurized by the ground. The pad part 6 may function to buffer a pressure received by the track main body 2 from the ground. The pad part 6 may be disposed to face the support plate 4 with respect to the track main body 2. The pad part 6 may be disposed to cover the outer surface of the track main body 2. Accordingly, the pad part 6 may be disposed between the track main body 2 and the ground to provide a surface that is pressurized by the ground. The pad part 6 can reduce the pressure applied to the track main body 2 from the ground by being elastically deformed as it is pressurized by the ground, and provide a uniform contact area with respect to the ground as a shape of the pad part 6 is deformed to correspond to the shape of the ground.

The pad part 6 may be integrally formed with the coupling part 5. The coupling part 5 may be inserted into each of the support coupling hole 41 formed in the support plate 4 and the main body coupling hole 21 formed in the track main body 2 to couple the support plate 4 and the track main body 2 to the pad part 6. Accordingly, the rubber track unit 1 according to the present disclosure may be implemented so that the coupling part 5 may be inserted into the support coupling hole 41 and the main body coupling hole 21 in a state of being supported by the pad part 6, thereby improving ease of an operation of inserting the coupling part 5 into the support coupling hole 41 and the main body coupling hole 21. In addition, the rubber track unit 1 according to the present disclosure may be implemented to selectively replace the support plate 4 and the pad part 6 separately or together by disassembling the coupling part 5, thereby improving convenience and ease of the maintenance operation.

Referring to FIGS. 3 to 6, in the rubber track unit 1 according to the present disclosure, a distance between the coupling part 5 and one side of the track main body 2 may be equal to a distance between the coupling part 5 and the other side of the track main body 2 with respect to a width direction. In other words, the coupling part 5 may be disposed at a center of the track main body 2 with respect to the width direction. In this case, the rubber track unit 1 according to the present disclosure may be implemented by a single pin method.

Referring to FIGS. 7 to 10, in the rubber track unit 1a according to the present disclosure, the distance between the coupling part 5a and one side of the track main body 2a may be shorter than the distance between the coupling part 5a and the other side of the track main body 2a with respect to the width direction. In other words, the coupling part 5a may be disposed to be biased toward one side of the track main body 2a from the center of the track main body 2a with respect to the width direction. Here, the width direction is a direction perpendicular to the direction in which the rubber track unit 1a circulates. When the direction in which the rubber track unit 1a circulates is the first axis direction (X-axis direction), the width direction may be a second axis direction (Y-axis direction) perpendicular to the first axis direction (X-axis direction). In this case, the rubber track unit 1a according to the present disclosure may be implemented by a double pin method.

Figure 7:
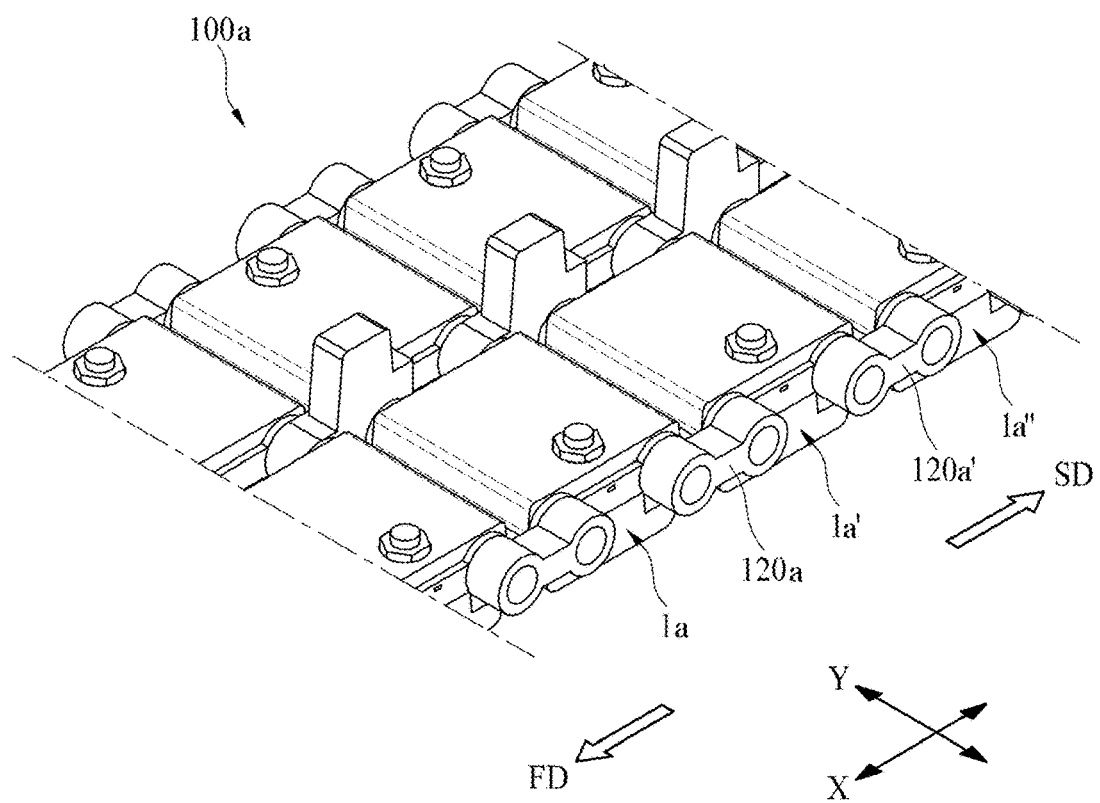
FIG. 7 is a partial schematic perspective view of another embodiment of the rubber track device for a vehicle to which the rubber track unit according to the present disclosure is applied.
Figure 8:
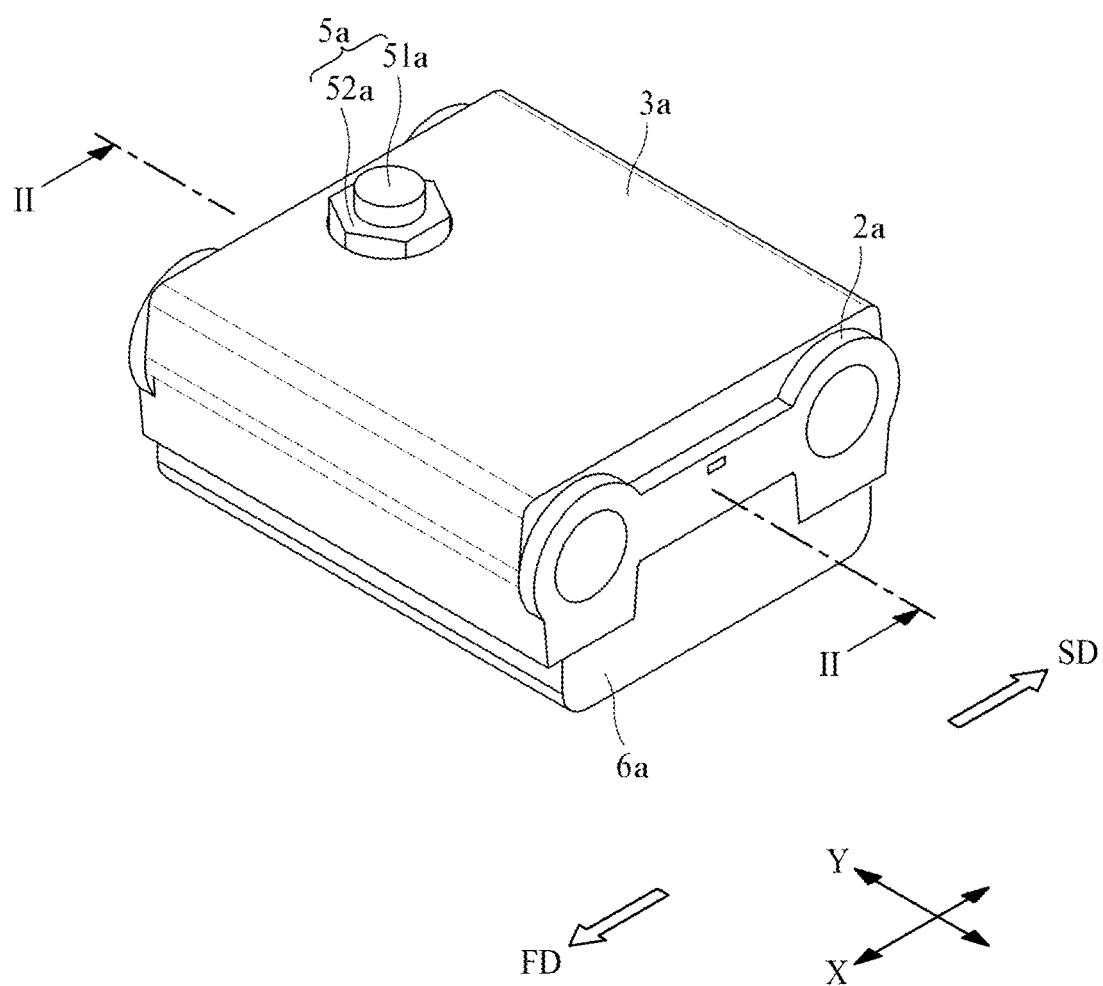
FIG. 8 is a schematic perspective view of another embodiment of the rubber track unit according to the present disclosure.

For example, as shown in FIGS. 7 and 8, the rubber track unit 1a according to the present disclosure may be formed by coupling a plurality of rubber track units formed symmetrically with respect to the second axis direction (Y axis direction). In addition, it is possible to form a rubber track module by coupling a counter rubber track unit 1'a formed in the same manner with respect to the first axis direction (X-axis direction). The rubber track module may be connected to an adjacent rubber track module through the connection part 120a to form the closed ring shape.

Figure 9:
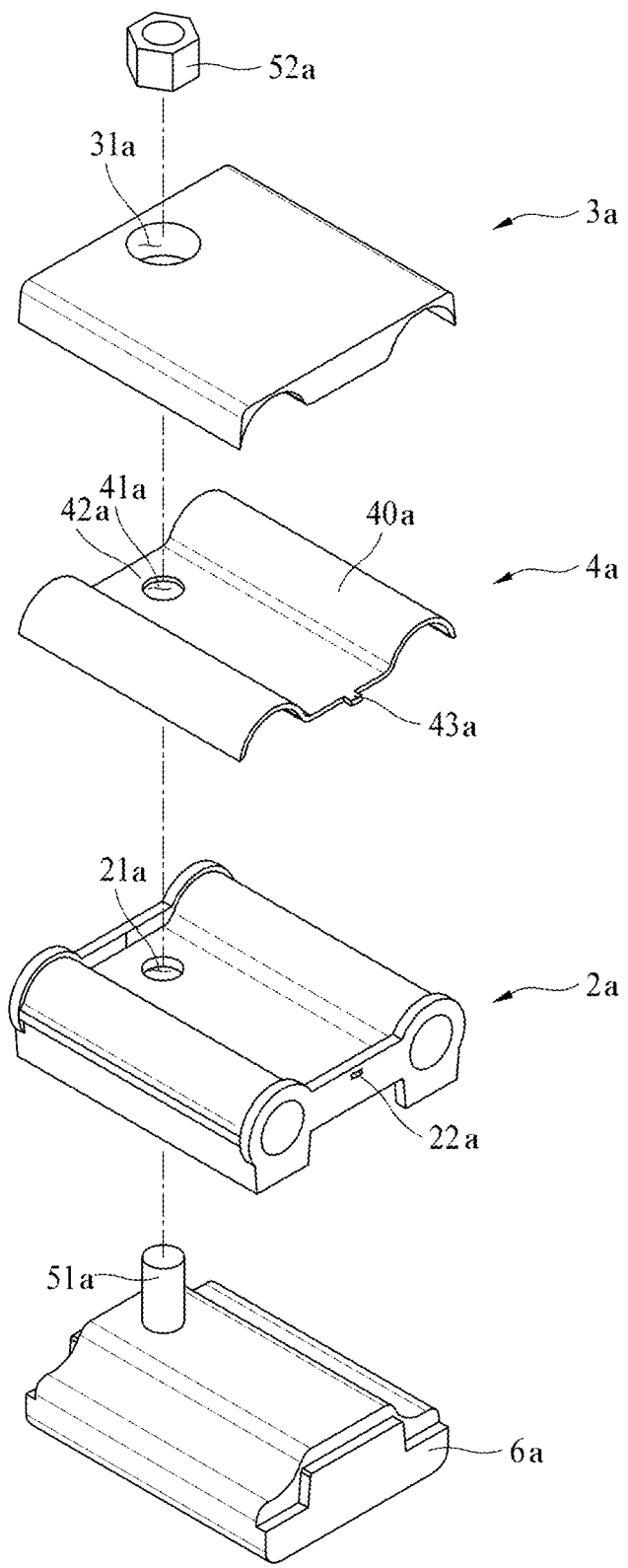
FIG. 9 is an exploded schematic perspective view of another embodiment of the rubber track unit according to the present disclosure.
Figure 10:
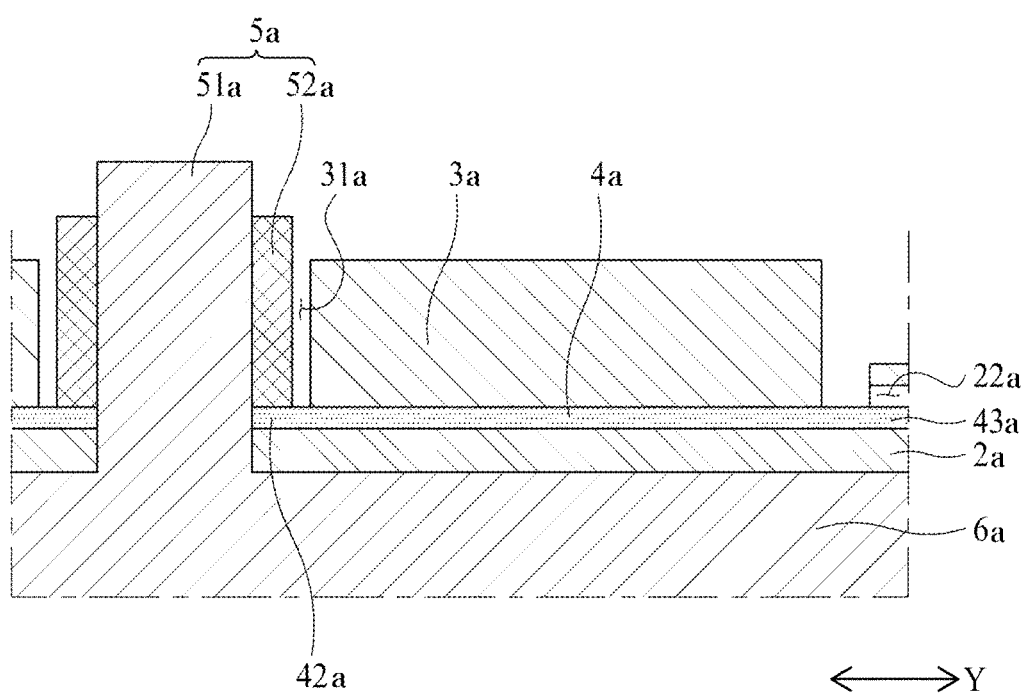
FIG. 10 is a partial schematic side cross-sectional view taken along line II-II in FIG. 8.

Referring to FIGS. 7 to 10, in the rubber track unit 1a according to the present disclosure, the support plate 4a may include a locking member 43a (shown in FIG. 9). The locking member 43a may be inserted into a locking hole 22a (shown in FIG. 9) formed in the track main body 2a to form a locking structure. Accordingly, the rubber track unit 1a according to the present disclosure may be implemented so that the separation of the support plate 4a from the track main body 2a is restricted by using the locking member 43a and the locking hole 22a. Accordingly, the rubber track unit 1a according to the present disclosure can further increase a coupling force between the support plate 4a and the track main body 2a through the locking structure using the locking member 43a and the locking hole 22a in addition to the coupling part 5a. The support plate 4a. may include a plurality of locking members 43a. The track main body 2a may include a plurality of locking holes 22a to correspond to the number of locking members 43a. The locking members 43a are spaced apart from each other and are inserted into the locking holes 22a, respectively to restrict the separation of the support plate 4a from the track main body 2a.

Meanwhile, referring to FIGS. 7 to 10, the support plate 4a may include a support main body 40a and the locking member 43a. The support main body 40 supports the elastic part 3a. The support main body 40a may be coupled to the track main body 2a to cover the inner surface of the track main body 2a. The locking member 43 may be formed to protrude from the support main body 40a. The support main body 40a may be coupled to the track main body 2a in a state in which the locking member 43a is inserted into the locking hole 22a. Accordingly, the support main body 40 may be restricted from being separated from the track main body 2a. The support coupling hole 41a may be disposed at one side of the support main body 40a, and the locking member 43 may be disposed at the other side of the support main body 40a. Accordingly, the rubber track unit 1a according to the present disclosure is implemented so that the coupling force between the support plate 4a and the track main body 2a may be distributed in a balanced manner by reinforcing the coupling force between the support plate 4a and the track main body 2a for the other side of the track main body 2a using the locking member 43a even when the coupling part 5a is disposed to be biased toward one side of the track body 2a from the center of the track main body 2a with respect to the width direction. Accordingly, the rubber track unit 1a according to the present disclosure may be implemented to not only strengthen the coupling force between the support plate 4a and the track main body 2a using the locking member 43a, but also distribute the coupling force between the support plate 4a and the track main body 2a in the balanced manner by disposing the locking member 43a, thereby further improving the coupling stability between the support plate 4a and the track main body 2a.

It will be apparent to those skilled in the art to which the present disclosure pertains that the above-described present disclosure is not limited to the above-described embodiments and the accompanying drawings, and various substitutions, modifications, and changes are possible without departing from the technical spirit of the present disclosure.

What is claimed is:

1. A rubber track unit, comprising:
a track main body configured to move by a drive transmitted from a sprocket installed in a vehicle;
an elastic part configured to provide a surface pressurized by a road wheel;
a support plate to which the elastic part is coupled; and
a coupling part configured to detachably couple the support plate and the track main body so that the elastic part is detached from or attached to the track main body,
wherein the track main body comprises a cylindrical main body insertion hole for accommodating a connection fixing part, and the connection fixing part is configured to be inserted into each of a connection insertion hole formed in a connection part for connecting the track main body to an adjacent track main body of an adjacent rubber track unit and the cylindrical main body insertion hole formed in the track main body to connect the connection part and the track main body.

2. The rubber track unit of claim 1, wherein the elastic part is bonded to the support plate through a vulcanization operation.

3. The rubber track unit of claim 1, wherein the coupling part includes an insertion portion configured to assemble the support plate and the track main body, and a fixing portion coupled to the insertion portion to fix the support plate to the track main body,
   the insertion portion is inserted into each of a support coupling hole formed in the support plate and a main body coupling hole formed in the track main body to assemble the support plate and the track main body, and
   the fixing portion fixes the support plate to the track main body by pressurizing the support plate toward the track main body.

4. The rubber track unit of claim 3, wherein the elastic part includes a receiving hole configured to receive the fixing portion,
   the receiving hole is formed to have a size larger than that of the support coupling hole, and
   the fixing portion fixes the support plate to the track main body by pressurizing a support fixing member surrounding a periphery of the support coupling hole in a state of being received in the receiving hole.

5. The rubber track unit of claim 1, comprising a pad part disposed to face the support plate with respect to the track main body,
   wherein the pad part and the coupling part are integrally formed, and
   the coupling part is inserted into each of a support coupling hole formed in the support plate and a main body coupling hole formed in the track main body to couple the support plate and the track main body to the pad part.

6. The rubber track unit of claim 1, wherein a distance between the coupling part and one side of the track main body is equal to a distance between the coupling part and the other side of the track main body with respect to a width direction.

7. The rubber track unit of claim 1, wherein a distance between the coupling part and one side of the track main body is shorter than a distance between the coupling part and the other side of the track main body with respect to a width direction.

8. The rubber track unit of claim 7, wherein the support plate includes a support main body configured to support the elastic part, a support coupling hole to which the coupling part is inserted, and a locking member protruding from the support main body to be inserted into a locking hole formed in the track main body, and
   the support coupling hole is disposed at one side of the support main body, and the locking member is disposed at the other side of the support main body.

9. The rubber track unit of claim 1, wherein the support plate includes a locking member, and
   the locking member is inserted into a locking hole formed in the track main body to form a locking structure.

\* \* \* \* \*